UNITED STATES PATENT OFFICE.

GEORGE WEST, OF SYRACUSE, NEW YORK.

PLASTERING COMPOUND.

SPECIFICATION forming part of Letters Patent No. 422,269, dated February 25, 1890.

Application filed July 18, 1888. Renewed August 2, 1889. Serial No. 319,494. (No specimens.)

*To all whom it may concern:*

Be it known that I, GEORGE WEST, of Syracuse, in the county of Onondaga, in the State of New York, have invented new and useful Improvements in Plastering Compounds, of which the following is a full, clear, and exact description.

My invention relates to an improved composition of matter to be used with plaster-of-paris, marble-dust, talc, soapstone, or sand, for plastering and other analogous purposes; and it consists, essentially, of a suitable retarder, preferably glue and dextrine, and in some instances I combine therewith sal-soda, compounded as hereinafter set forth, and used in about the following proportions, viz: Two parts of glue, two parts to three parts of dextrine, and when desired also two parts of sal-soda.

I prepare the composition in the following manner, to wit: I dissolve glue in water, ordinarily taking about six parts of water to two parts of glue. With this solution I mix about three parts of dextrine, although the quantity of the latter may be varied within reasonable limits.

When it is desired to have the compound dry and in a merchantable condition, I take up the moisture of the aforesaid solution of glue before mixing therewith the dextrine by adding to the said solution a sufficient quantity of dry mineral absorbent, which may consist either of whiting, clay, or equivalent material. In practice I find that about twenty parts of this absorbent are sufficient for the aforesaid purpose, and after the moisture has thus been taken from the aforesaid solution I mix therewith the aforesaid quantity of dextrine. The office of the dextrine is to give the required hardness and adhesiveness to the material, and it also serves to retain the moisture sufficiently to facilitate the spreading of the mortar under the trowel.

By adding about two pounds of sal-soda to the aforesaid compound of glue and dextrine I impart to the completed material a consistency which allows it to be worked more easily. It is preferred to add the sal-soda to the glue in process of being dissolved, inasmuch as the sal-soda accelerates said process.

The office of the glue is to retard the setting action of the completed material, and any other suitable and well-known retarder—such as molasses and other substances—may be substituted for the glue.

The composition is desired to be used with plaster-of-paris, sand, talc, soapstone, and marble-dust in plastering the walls and ceilings of buildings, making wall-moldings and cornices, and for other analogous purposes.

When used for what is termed in plastering the "scratch-coat," I take about one pound of the compound and mix it thoroughly by the ordinary and well-known means with about thirteen pounds of plaster-of-paris or equivalent material and about sixty pounds of sand. The quantity of the sand used I have found in practice may be greatly varied—as, for instance, I have used as little as forty pounds, and then again as much as seventy-five pounds, with substantially the same result.

When what is termed in plastering the "finishing-coat" is desired, I add one pound of the compound to the same quantity of plaster as when a scratch-coat is required, but in place of the sand I use about twenty-two pounds of marble-dust, talc, or soapstone. The proportion of the latter may, however, be considerably varied, as I have found in practice.

When a very fine white coat is required, I prefer to use talc. When a fine gray coat is required, I prefer to use soapstone.

The office of the glue is to retard the setting of the plaster, and in its place any well-known retarder—such as molasses, citric, tartaric, or acetic acid—may be used. It is of course obvious that, if desired, marble-dust, talc, or marble-dust and soapstone can be combined.

To absorb the moisture arising from dissolving the glue and sal-soda in the water, I may use in place of the whiting or clay plaster-of-paris, marble-dust, or any similar dry material capable of absorbing the moisture.

Having described my invention, what I claim is—

1. The composition of matter consisting of glue, dextrine, and sal-soda, as set forth.

2. The improved composition of matter consisting of glue, dextrine, sal-soda, and a dry mineral absorbent, substantially as specified.

In testimony whereof I have hereunto signed my name, in the presence of two witnesses, at Syracuse, in the county of Onondaga, in the State of New York, this 16th day of July, 1888.

GEORGE WEST. [L. S.]

Witnesses:
C. H. DUELL,
MARK W. DEWEY.